(12) United States Patent
Roux

(10) Patent No.: US 6,919,049 B1
(45) Date of Patent: Jul. 19, 2005

(54) SYSTEM FOR NEUTRALIZING POLLUTING GASES BY PYROLYSIS

(76) Inventor: Claude Roux, 69, avenue Pierre Colongo, F-93290 Tremblay en France (FR)

( * ) Notice: Subject to any disclaimer, the term of this patent is extended or adjusted under 35 U.S.C. 154(b) by 0 days.

(21) Appl. No.: 09/869,302

(22) PCT Filed: Jan. 19, 2000

(86) PCT No.: PCT/FR00/00101

§ 371 (c)(1),
(2), (4) Date: Dec. 10, 2002

(87) PCT Pub. No.: WO00/43094

PCT Pub. Date: Jul. 27, 2000

(30) Foreign Application Priority Data

Jan. 19, 1999 (FR) .................................. 99 00483

(51) Int. Cl.[7] .......................... F01N 3/00; B01D 53/34
(52) U.S. Cl. ..................................... 422/168; 422/179
(58) Field of Search .............................. 422/168, 173, 422/174, 177, 179, 180, 199, 211, 181, 139, 422/21, 900

(56) References Cited

U.S. PATENT DOCUMENTS

| 2,631,921 A | * | 3/1953 | Odell .......................... 423/659 |
| 3,598,543 A | * | 8/1971 | Crosby et al. .............. 422/175 |
| 3,675,398 A | | 7/1972 | Giarrizzo |
| 3,918,915 A | * | 11/1975 | Holler, Jr. ................... 422/170 |
| 4,027,476 A | * | 6/1977 | Schmidt ....................... 60/218 |
| 4,404,007 A | * | 9/1983 | Tukao et al. ................. 55/523 |
| 4,578,091 A | | 3/1986 | Borja |
| 4,695,301 A | * | 9/1987 | Okajima et al. .............. 55/523 |
| 4,928,485 A | * | 5/1990 | Whittenberger .............. 60/299 |
| 5,211,918 A | * | 5/1993 | Harle .......................... 422/171 |
| 5,275,790 A | * | 1/1994 | Buchholz et al. ........... 422/217 |
| 5,440,876 A | * | 8/1995 | Bayliss et al. ................. 60/274 |
| 5,519,191 A | * | 5/1996 | Ketcham et al. ............ 219/552 |
| 5,811,064 A | * | 9/1998 | Kojima et al. .............. 422/180 |
| 6,143,254 A | * | 11/2000 | Erven et al. ................. 422/169 |

FOREIGN PATENT DOCUMENTS

| DE | 14 76 627 | 4/1970 |
| FR | 2 702 004 | 9/1994 |
| GB | 1 396 607 | 6/1975 |
| WO | WO 92/14042 | 8/1992 |
| WO | WO 98/37944 | 9/1998 |

OTHER PUBLICATIONS

Patent Abstract of Japan, JP 61-135921, Jun. 23, 1986.

* cited by examiner

*Primary Examiner*—Kevin P. Kerns
(74) *Attorney, Agent, or Firm*—Oblon, Spivak, McClelland, Maier & Neustadt, P.C.

(57) ABSTRACT

A system for neutralizing polluting gases from petrol and diesel internal combustion engines, or industrial smoke. The neutralizing system includes modules assembled together or integrated, chosen in accordance with the quantity of pollutant gases and their nature. The modules may include: hollow metal or mineral sphere-type pyrolisis heat cell module containing excrescences forming a large exchange area with polluting gases, or electric heaters, particle and HC filter, polluting gas purification module, sound damping and gas temperature reduction module.

6 Claims, 4 Drawing Sheets

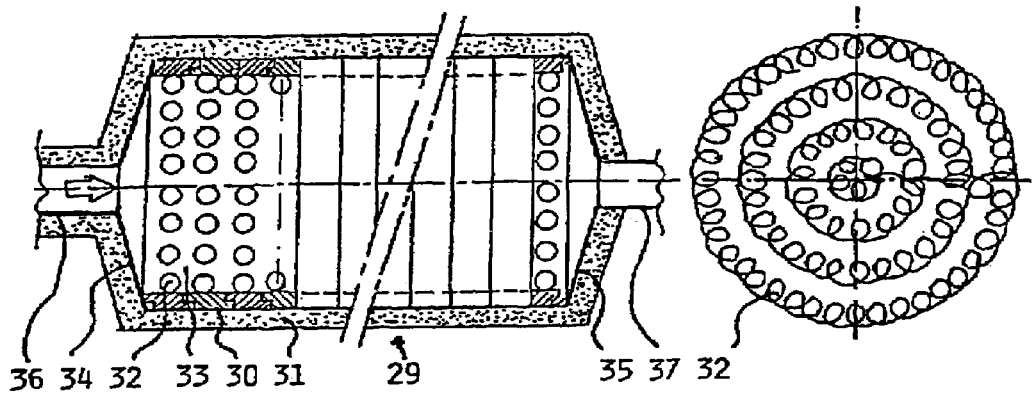
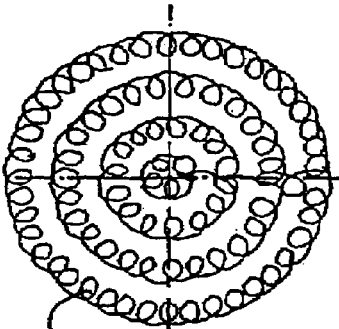
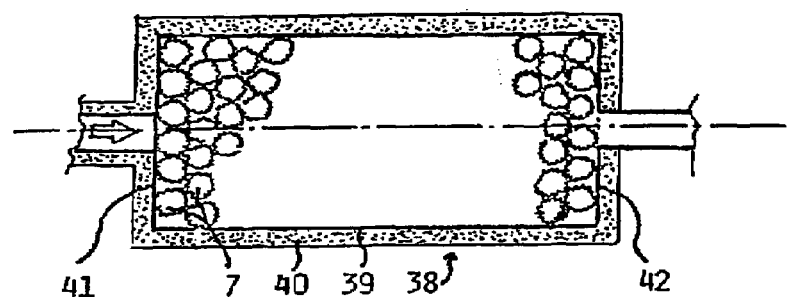
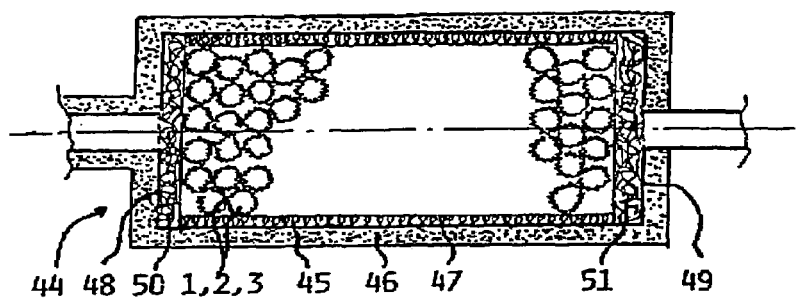
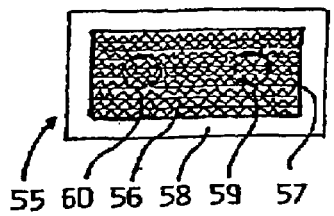
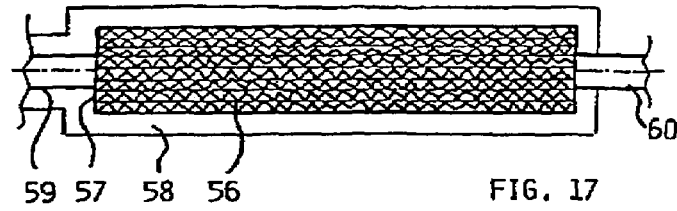

SYSTEM FOR NEUTRALIZING POLLUTING GASES BY PYROLYSIS

The invention concerns a system for neutralising pollutant gas by the pyrolisis of particles and soot in suspension, emitted in particular by petrol or diesel internal combustion engines, or by all types of industrial combustion emitting noxious smoke, for example waste incineration plants.

It is known in particular that the combustion of fuels feeding petrol or diesel internal combustion engines can never be balanced and complete in particular because of a lack of air at the transient instant and the presence mainly of noxious substances in the exhaust gas such as carbon monoxide CO, unburnt or partially burnt hydrocarbons HC, nitrogen oxides $NO_x$ and solids such as particles and soot. The appearance of particles and soot results from carburetion with too little air. It occurs notably at transients: moving off when traffic lights change to green, changes of speed on the level, on hills and when accelerating.

Systems are already known for processing these pollutants such as "catalytic converters on cars and more recently on diesel lorries, employing catalysts designed to oxidise mainly the carbon monoxide, unburnt or partially burnt hydrocarbon residues and nitrogen oxide $NO_x$. The drawbacks shown by this type of system lie in particular in the difficulty of choosing an effective metal or metal oxide catalyst to accelerate these reactions. A catalyst that reduces the $NO_x$ beyond $N_2$, into $N_3H$, is not suitable because the ammonia released into the atmosphere re-oxidises into $NO_x$. Another important drawback of this system appears when an internal combustion engine starts from cold until the catalytic converter reaches optimal running temperature. During this period, emissions of pollutants not only are not reduced, but are increased. This drawback requires costly, noble metals to be chosen such for example as platinum which acts at low temperature. In addition, the sulphur $SO_2$ in petrol is oxidised into $SO_3$ by the catalyst, which generates sulphuric acid. In general, catalytic converters are very expensive, reduce engine power, increase fuel consumption by adding an additional weight to the vehicles empty weight, they only neutralise part of the pollutants and their effectiveness is limited. As regards "gas washing" processes, they are excessively costly.

Systems designed to destroy by combustion the particles in the polluting exhaust emitted from diesel engines are also known. This combustion allows toxic carbon residues to remain. Particle filters are also known, but they block very quickly and need to be changed or a regeneration system to be added which increases the cost.

Document WO 92 14042 A describes a polluting gas neutralisation system consisting of a pyrolisis heat cell arranged to retain and destroy residues from incomplete combustion by means of presenting a large exchange area.

Document FR-A-2 702 004 mentions that on heat destruction by pyrolysis of residues from incomplete combustion, that they are only partly oxidised which produces dust. It also mentions a means of noise abatement during the pyrolisis of residues from incomplete combustion.

Document DE 14 76 627 A discloses a filtration device combining filtering units (37, 44, 46) and noise abatement units.

Document GB-A-1 396 607 describes a polluting gas neutralisation system consisting of a pyrolisis heat cell consisting of an interchangeable linear electric heater assembly (26a to 26e) spanning the heat cell between insulating plates (45). The exchange area of these heating elements with the pollutants crossing the heat cell is low and not very efficient.

Document WO 90 04 707 describes a polluting gas neutralisation system consisting of a stack of metal plates each of them carrying on its surface multiple excrescences, the said plates being coiled in a spiral and inserted into the chamber of a cylindrical pyrolisis heat cell. The said plates can be run as electrical heaters.

The problem to be solved consists particularly of:
  providing a simple, durable system considerably reducing the emission of polluting gases from internal combustion engines and from various factories, to a level very much lower than those already obtained by existing systems meeting the strictest standards;
  providing the system at a cost equal and preferably less than that of traditional means of equal effectiveness;
  not introducing any loss of power that increases fuel consumption and reduces power in the case of internal combustion engines;
  substantially increasing the life of the system;
  reducing the emission of polluting gasses from various industrial processes (waste incineration plants, oil fired municipal heating or even domestic oil fired heating and all types of emissions of noxious smoke containing various particles in suspension that can be destroyed by pyrolisis).

The system according to the invention is intended to counter the aforementioned drawbacks, solve the problem posed above and provide a range of means of effectively reducing pollutants emitted by diesel or petrol internal combustion engines, covering a broad part of the power range of existing fixed or mobile engines on the market, the system being adaptable to the pyrolisis of industrial smoke.

The system according to the invention consists of a means of neutralising polluting gases consisting of a pyrolisis heat cell arranged to retain and destroy the residues from incomplete combustion, by the intermediary of means presenting a very large exchange area at pyrolisis temperature with the said gases. The said exchange and pyrolisis area being made to almost instantly reach the temperature of the said exhaust gases once the internal combustion engine is started up.

Under a first method of construction, the exchange and pyrolisis area consists of a set of spheres each containing, over its entire surface, numerous excrescences (1, 2, 3) for example of diamond pointed type or similar. The spheres, each bearing numerous excrescences, are machined from limestone or any other kind of rock. The spheres can also be obtained by moulding mineral powder, preferably limestone.

The spheres with their excrescences can be stamped out as two welded parts, from a metal with a high coefficient of heat transmission, as sheets of very low thickness. The spheres are processed to size and put into a pyrolisis heat cell of corresponding size.

In accordance with a second variant of construction, the means of neutralising polluting gases presenting a very large exchange area consists of a stack of very thin metal plates of high coefficient of heat transmission, each carrying, over its entire area, numerous preferably identical excrescences, stamped staggered compared to the gas flow direction. These pyrolisis plates are put into an insulated heat cell of rectangular or square section.

In accordance with a third variant of construction, the means of neutralising polluting gases presenting a very large exchange area consists of a single pyrolisis plate wound as a spiral and put into the chamber of an insulated cylindrical heat cell. The spiral plate is brought up to temperature by switching it on just before the engine is started up, by using it as an electrical heater.

In accordance with a fourth variant of construction, the means of neutralising polluting gases consists of a set of interchangeable electrical heaters wound flat as spirals and stacked in an insulated enclosure. The pyrolisis exchange area is brought up to temperature, when the engine is started up, by a discharge from condensers of adequate capacity. To prevent heat losses, the pyrolisis heat cell is arranged as close as possible to the engine and is fully insulated as is the exhaust gas pipe between the internal combustion engine and the said pyrolisis heat cell.

The system according to the invention consists of modules assembled together or integral, chosen in accordance with the amount and type of polluting gases, from some or all of the following modules: pyrolisis heat cell module, particle and HC filtration and polluting gas purification module, silencer and gas temperature reduction module.

For high or very high quantities of polluting gasses, the pyrolisis function is provided by a battery of heat cells containing an input collector and an output collector which, when necessary, work together with a smoke extractor.

The advantages of the present invention are as follows:
Very substantial reduction in polluting gases;
Longer life than traditional exhaust converters because of the absence of water vapour and continuous regeneration by vibration of the pyrolisis heat cell;
Possibility of making very compact extra-thin systems for all engine powers;
No loss of engine power;
No excess fuel consumption;
Little added weight compared to traditional exhaust converters;
Is operational from when the engine starts up;
Suitable for all stationary engines
Can be used for reducing industrial smoke and smoke from oil central heating facilities.

The invention is described in detail in the text below, in reference to the appended drawings that are provided as non-limiting examples, in which.

Figure 10:
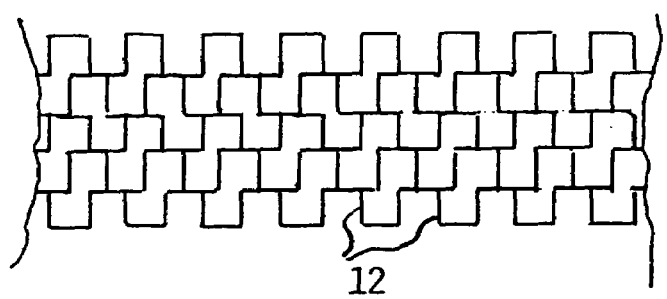
Figure 11:
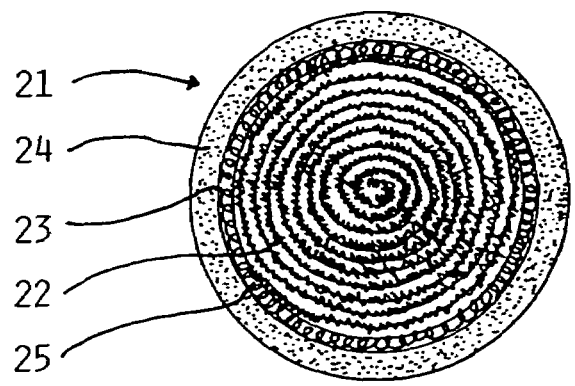
Figure 18:
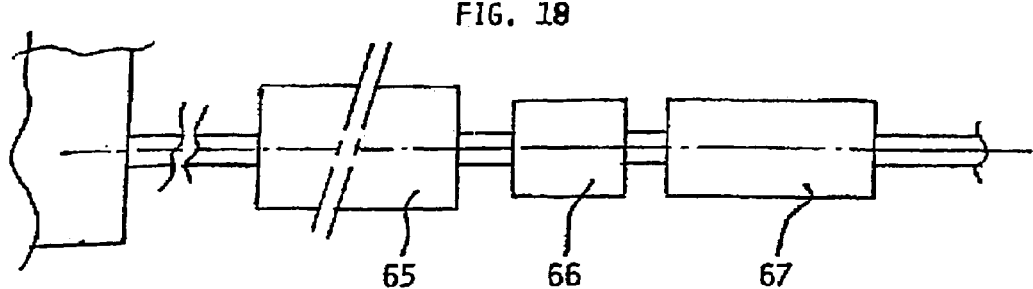
Figure 19:
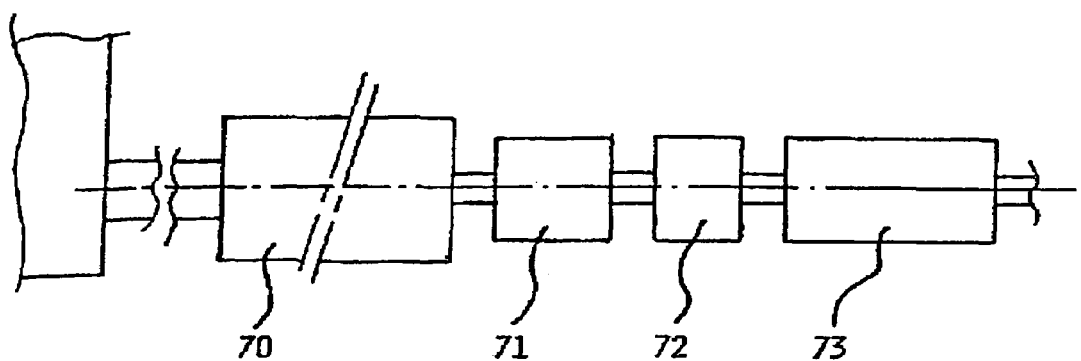

FIG. 10 partially shows a diagrammatic example of the stacking of thin metal plates bearing cylindrical excrescences intended to retain and heat unburnt or partly burnt particles or HC of the system according to the invention;

FIG. 11 shows diagrammatically the spiral winding of a thin metal plate bearing excrescences intended to retain and heat unburnt or partly burnt particles or HC of the system according to the invention;

FIGS. 12 and 13 show a diagrammatic example of the construction of an exchange and pyrolisis surface consisting of a set of electrical heater elements wound in a flat spiral, as front view and side view cross-sections;

FIG. 14 shows diagrammatically, as a front view cross-section, an example of the construction of the exchange and heating surface consisting of a set of hollow metal spheres, bearing excrescences, in place in a sealed, insulated chamber;

FIG. 15 shows diagrammatically, as a front view cross-section, an example of the construction of the exchange and pyrolisis surface consisting of a set of mineral metal spheres bearing excrescences, in place in a sealed, insulated chamber after placement between them of a metal sock and flat rings consisting of stainless steel swarf;

FIGS. 16 and 17 show diagrammatically, as an end cross-section and as a front view cross-section, an example of the heating heat cell containing exchange and heating surfaces consisting of a set of plates bearing excrescences, in place in a sealed, insulated chamber;

FIG. 18 shows diagrammatically, as a front view, an example of the known type of catalytic converter;

FIG. 19 shows diagrammatically, as a front view, an example of the complete pyrolisis converter in accordance with the invention for heavy goods vehicles, buses and coaches, heavy plant, etc.

Figure 1:
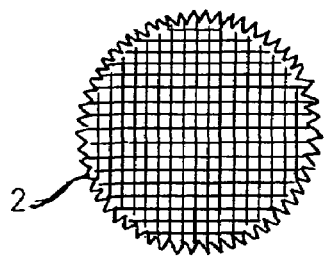
FIGS. 1 to 4 show diagrammatic examples of means of producing the pseudo-spherical exchange and pyrolisis surfaces of the system according to the invention for a diesel or petrol engine.
Figure 2:
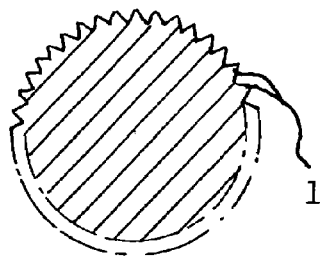
Figure 3:
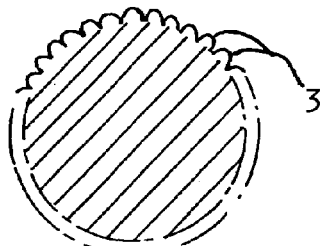

As shown in FIGS. 1 to 3, the example of the large exchange and pyrolisis surface in accordance with the invention to dry exhaust gases, retain and quickly pyrolise unburnt or partially burnt particles and HC, consists of excrescences machined on the surface of mineral spheres. The shape of these identical excrescences is preferably one that offers the greatest exchange area with the gases. They may, for example, be "diamond pointed" 2, more keenly pointed 1 (Isosceles pyramids) or hemispherical 3 or other shapes easy to achieve by machining or moulding mineral dust such as limestone under pressure. By moulding, it is possible to get other shapes bearing these excrescences other than spheres, but spheres are preferable because they provide the greatest exchange area at equal volume and facilitate the circulation of gases.

Figure 4:
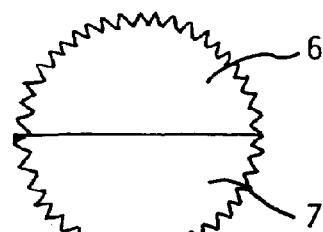

FIG. 4 shows an example of the hollow sphere made of thin metal, about 4 mm thick, bearing diamond pointed excrescences, stamped in halves (6 and 7) and electric or ultrasonic welded for example. The material is to be chosen from ones providing the best coefficient of heat transmission and corrosion-resistance to exhaust gasses and other toxic emissions. As an example, the diameter of the spheres is around 20 mm for cars, 50 mm for coaches and 60 mm for heavy goods vehicles. The quantity of spheres depends on the throughput of pollutants to be neutralised.

The primary function of the excrescences is to reduce the thermal inertia of the surface of the spheres such that they almost instantly reach the temperature of the exhaust gases once the internal combustion engine is started up, it not being necessary to heat the spheres right through to be effective. They form a mass of accumulated heat. The secondary function of the excrescences is to increase the exchange area with the gases and retain passing unburnt or partially burnt particles and residues that adhere to the excrescences more readily with diminishing size and heat more quickly. The third function of the excrescences is to facilitate the throughput of gases by preventing the occurrence of a loss of charge reducing the power of the engine.

The pyrolisis of particles and soot considerably reduces their volume, or even makes them almost totally disappear. After pyrolisis, particle residues no longer contain toxic carbon CO which is converted into non-toxic $CO_2$. HC are also converted by the pyrolisis and become harmless. The water $H_2O$ produced by combustion of the fuel is eliminated on passing through the spheres. The very low particle and HC residues end up by being released due to the vibrations caused by driving and gasses moving through, which continuously regenerates the exchange surfaces. This very low volume of residues is driven by the pressure of the gases into the following filter part.

Hollow mineral or metal spheres represent a first means of producing the exchange and pyrolisis surface. In the specific case of large diameter spheres, the throughput apertures between the spheres are large and liable to allow un-neutralised or insufficiently neutralised particles and soot to pass.

Figure 5:
FIGS. 5, 6 and 7 show diagrammatic cross-section examples of the pseudo-flat exchange and pyrolisis surfaces of the system according to the invention for a diesel or petrol engine.
Figure 6:
Figure 7:
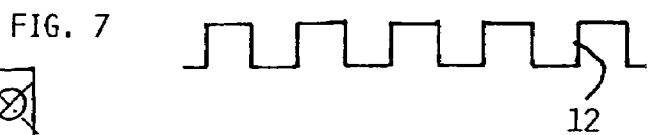
Figure 8:
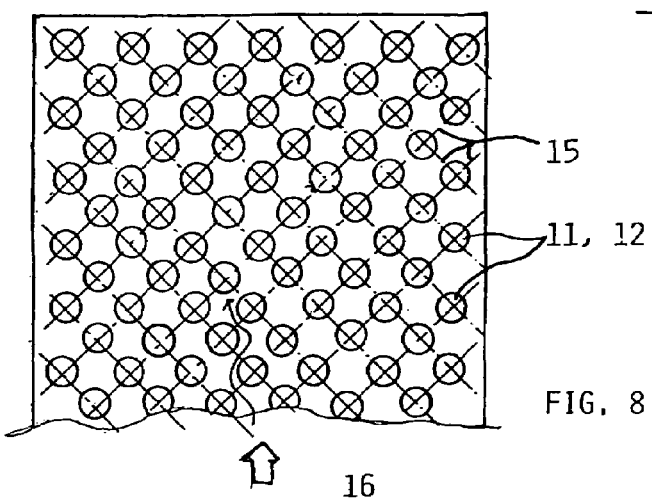
FIG. 8 shows, seen from above, a diagrammatic example of the arrangement of the hemispherical or cylindrical excrescences as in FIGS. 6 and 7 intended to retain and heat unburnt or partly burnt particles or HC of the system according to the invention.

FIGS. 5 to 11 show another model for producing very large exchange surfaces much more compact and regular than with spheres. FIGS. 5, 6 and 7 show examples of excrescences of various known shapes on spheres: diamond pointed 10, hemispherical 11 or cylindrical 12, stamped on flat surfaces, preferably arranged as a mesh 15 staggered in accordance with an angle for example of 45° compared to the direction 16 of gas flow, to avoid direct tunnels.

The staggered arrangement makes the gases follow a route including a number of obstacles against which particles and soot are thrown and fragment because of the impact due to the speed of the gases, mainly at the start of the circuit reducing their size and adhering to the excrescences at a temperature of around 800 to 900 degrees C., on which they are converted chemically and reduced to inert residues of very low volume. The length of travel of the gases in the pyrolisis heat cell is arranged such that almost all of the particles and soot are neutralised. These low residues then detach because of vibration and are then removed by the pressure of the gases in the following filter.

Figure 9:
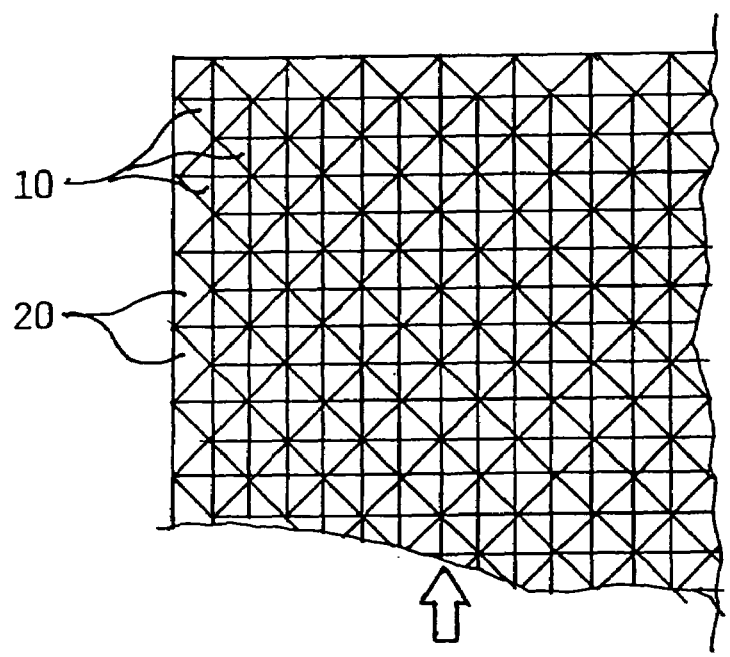
FIG. 9 shows, seen from above, a diagrammatic example of the arrangement of the excrescences known as diamond point as in FIG. 5 intended to retain and heat unburnt or partly burnt particles or HC of the system according to the invention.

FIG. 9 shows an example of the arrangement of the excrescences stamped as diamond points on a plate 20. The diamond points are arranged such that no flat parts remain on the plate 20 except locally at the edges.

This arrangement provides the largest possible exchange surface while allowing vibration to be limited. In the instance of diamond points, some of them have been omitted from place to place to allow them to be stacked by allowing a space to remain of point height for gases to circulate. The height of the points or excrescences is calculated in accordance with the maximum throughput of exhaust gases to prevent load losses.

FIG. 10 shows a partial stack of pyrolisis plates with closed cylindrical shaped excrescences 12 arranged staggered intended to completely fill the pyrolisis heat cell.

FIG. 11 shows an example of the cylindrical pyrolisis heat cell 21 consisting of a pyrolisis plate 22 in FIGS. 5, 6 or 7, wound with no centre and banded, put into the chamber 23 of the heat cell containing insulation 24, onto which the roll is located by force, or is enclosed in a stainless steel sock 25 before it is put into the heat cell. The structure of the heat cell is identical to that of the heat cells in the following figures.

FIGS. 12 and 13 show diagrammatically a front cross-section and side cross-section of an example of the pyrolisis heat cell 29 consisting of a cylindrical chamber 30 wrapped with insulating material 31, in which a set of identical electric heaters is arranged 32 wound in a flat spiral fitted with a space 33 between them. The electric heaters can be assembled in various known ways.

The gas inlet 34 and outlet 35 closure flanges preferably form a cone opening onto the gas inlet 36 and outlet 37 pipes. The well known electrical insulation and skin bushing method is not shown. The temperature of the heaters is calibrated in accordance with the nature of the pollutants to be reduced by pyrolisis. The number of heaters and diameter of the heat cell depend on the throughput of gas. For maintenance, this type of heat cell is fitted with interchangeable heaters. Each ceramic ring carrier for a heater with its usual means of fixing, contains for example two shoulders the reverse way around, which enables them to be successively seated. The heaters are connected for example by terminals. The insulated chamber can be made as two half shells so can be dismantled and faulty heaters changed.

This type of heat cell can be used for a large number of industrial applications independent of the pyrolitic exhaust gas converter application for internal combustion engines, in particular for large oil-fired heating plants that also emit a lot of soot and notably contribute to urban pollution. For very high outputs of industrial smoke, for example from waste incineration plants, batteries of pyrolitic heat cells can be installed with an inlet collector and an outlet connector, working with a smoke extractor to prevent back pressure when outlet speed is low.

The benefit of this type of heat cell lies in the fact that it is possible to accurately control the temperature of pyrolisis as required.

FIG. 14 shows diagrammatically a front cross-section of an example of the cylindrical pyrolisis heat cell 39 enclosed in insulation 40, whose exchange surface consists of a set of hollow metal spheres 7 bearing excrescences, previously adjusted to the size of the heat cell in a stainless steel net, located by crimping the closure skin 41 or 42. The number and diameter of the spheres and diameter and length of the heat cell depend on the quantity and nature of the gases (petrol, diesel or others in applications other than engines).

FIG. 15 shows diagrammatically a front cross-section of an example of the cylindrical pyrolisis heat cell 44 containing a sealed skin 45 enclosed in insulation 46, whose exchange surface consists of a set of mineral spheres 1, 2 or 3, carrying excrescences, previously adjusted to the size of the heat cell in a stainless steel net, and inserted in a sock 47, located before crimping of the closure skin 48 or 49 after insertion of flat rings 50, 51 consisting of a meshed stainless steel wire, presenting in cross section three very sharp edges, also previously enclosed in a stainless steel net. The particles and soot are fragmented by impact on its successive edges through its meshing in the flat ring. The wire can be obtained in the form of continuous lathe swarf. It is then meshed. Because of its nature, the flat ring acts as a sound damper to lower the noise level of the exhaust gases.

The number and diameter of the spheres and the length and diameter of the heat cell depend on the quantity of gases and their nature (petrol, diesel or others in applications other than vehicle engines).

FIGS. 16 and 17 show diagrammatically an end cross-section and front cross-section of another example of the pyrolisis heat cell 55 containing exchange surfaces consisting of a set of pyrolisis plates 56 in accordance with one of the FIGS. 5, 6 or 7, bearing excrescences 10, 11 or 12, in place in a sealed chamber 57 surrounded by insulation 58 of rectangular cross-section; consisting of a gas inlet pipe 59 and outlet pipe 60 offset in relation to one another. This type of pyrolisis heat cell is much more compact than sphere-type pyrolisis heat cell because the entire volume is used for exchange with the gases, which is not the case with the volume within the spheres.

FIG. 18 shows a traditional catalytic converter configuration consisting of a catalyst module 65, an intermediate filter module 66 and a noise damping silencer module 67.

FIG. 19 shows diagrammatically the fullest configuration of the system in accordance with the invention for high powered engines. This configuration consists of modules 71, 72, and 73 assembled with one another by crimping their inlet pipe and outlet pipe. The same type of module can be produced according to a range of different lengths and/or cross-sections, which enables systems to be made to suit the throughput, the nature of gases and density of their load of particles or soot to be heated, for predetermined power ranges, by the choice of some or all of the following modules: a neutralization by pyrolisis module 70.

The function of the filter module can also be provided for example by an accordion carbon filter-type paper also enclosed in a stainless steel net. The job of the volume of the carbon filter is to retain the very fine pyrolisis residues from the previous means, to continue the reduction of residual gaseous components that they may contain, and to purify residual gaseous pollutants as they pass through, to continue their neutralisation; a deodorising and neutralising gas injection module 72.

What is claimed is:

1. A pollutant neutralizing system, comprising:
a pyrolytic heat cell configured to retain and destroy pollutants through means for neutralizing by pyrolysis, said means comprising a large exchange area at a temperature of pyrolysis with said pollutants, wherein said means comprises an assembly of spheres each containing, over its entire surface, numerous excrescences of diamond point or similar type machined from limestone rock.

2. The pollutant neutralizing system in accordance with claim 1, wherein spheres in the assembly of spheres are stamped as halves from a sheet of metal 0.4 mm thick and then welded together.

3. The pollutant neutralizing system in accordance with claim 1, wherein exchange pyrolysis surfaces of the pyrolytic heat cell comprise an assembly of hollow metal spheres with excrescences filling a chamber of the pyrolytic heat cell.

4. The pollutant neutralizing system in accordance with claim 1, wherein said means further comprise a set of mineral spheres with excrescences, enclosed in a stainless steel net, and put into a chamber of the heat cell after an insertion of flat rings configured to fragment by impact unburnt or partially burnt particles or HC, comprising a mesh of stainless steel swarf, arranged ahead of the pyrolysis spheres along a gas flow direction.

5. The pollutant neutralizing system in accordance with claim 2, wherein exchange and pyrolysis surfaces of the pyrolytic heat cell comprise an assembly of hollow metal spheres with excrescences filling a chamber of the pyrolytic heat cell.

6. The pollutant neutralizing system in accordance with claims 2, wherein said means further comprise a set of mineral spheres furnished with excrescences, enclosed in a stainless steel nets and put into a chamber of the heat cell after an insertion of flat rings configured to fragment by impact unburnt or partially burnt particles or HC, comprising a mesh of stainless steel swarf, arranged ahead of the pyrolysis spheres along a gas flow direction.

* * * * *